United States Patent
Schüssler et al.

(10) Patent No.: US 6,383,468 B1
(45) Date of Patent: May 7, 2002

(54) METHOD FOR OPERATING A SYSTEM FOR WATER-VAPOR REFORMING OF A HYDROCARBON

(75) Inventors: Martin Schüssler, Ulm; Detlef Zur Megede, Kirchheim, both of (DE)

(73) Assignee: Xcellsis GmbH, Kirchheim/Teck-Nabern (DE)

(*) Notice: Subject to any disclaimer, the term of this patent is extended or adjusted under 35 U.S.C. 154(b) by 0 days.

(21) Appl. No.: 09/581,681
(22) PCT Filed: Dec. 14, 1998
(86) PCT No.: PCT/EP98/08174
§ 371 Date: Jul. 20, 2000
§ 102(e) Date: Jul. 20, 2000
(87) PCT Pub. No.: WO99/31012
PCT Pub. Date: Jun. 24, 1999

(30) Foreign Application Priority Data

Dec. 16, 1997 (DE) .......................................... 197 55 814

(51) Int. Cl.$^7$ ................................................. C01B 3/26
(52) U.S. Cl. ........................ 423/651; 423/652; 252/373
(58) Field of Search ............................... 423/650, 651, 423/652; 252/373

(56) References Cited

U.S. PATENT DOCUMENTS 5,112,527 A * 5/1992 Kobylinski .................. 252/373

FOREIGN PATENT DOCUMENTS

| DE | 44 23 587 A | 1/1996 | ............ C01B/3/02 |
|----|-------------|--------|-----------------------|
| EP | 0 217 532 A | 4/1987 | ............ C01B/3/32 |
| FR | 1 417 757 A | 2/1977 | ............ C01B/3/38 |
| GB | 2 132 108 A | 7/1984 | ............ B01J/8/02 |
| JP | 63 129002 | 6/1988 | ............ C01B/3/38 |
| WO | 96 00186 A | 1/1996 | ............ C01B/3/38 |

* cited by examiner

*Primary Examiner*—Steven P. Griffin
*Assistant Examiner*—Maribel Medina
(74) *Attorney, Agent, or Firm*—Crowell & Moring LLP

(57) ABSTRACT

A method for operating a system for the steam reforming of a hydrocarbon or hydrocarbon derivative starting substance includes, during the cold-starting of the system, at least part of a reforming reactor is used as a multi-function reactor unit. A fuel and an oxygen-containing gas is delivered to the reforming reactor as a catalytic burner unit in a first operating phase. In a subsequent second operating phase, the reforming reactor is a partial oxidation unit for the starting substance. Water may be added shortly before the second operating phase commences. Alternatively, or in addition thereto, the fuel flow rate may be increased with a rising temperature in the first operating phase or a substoichiometric oxygen flow rate may be set as early as in the first operating phase.

10 Claims, 1 Drawing Sheet

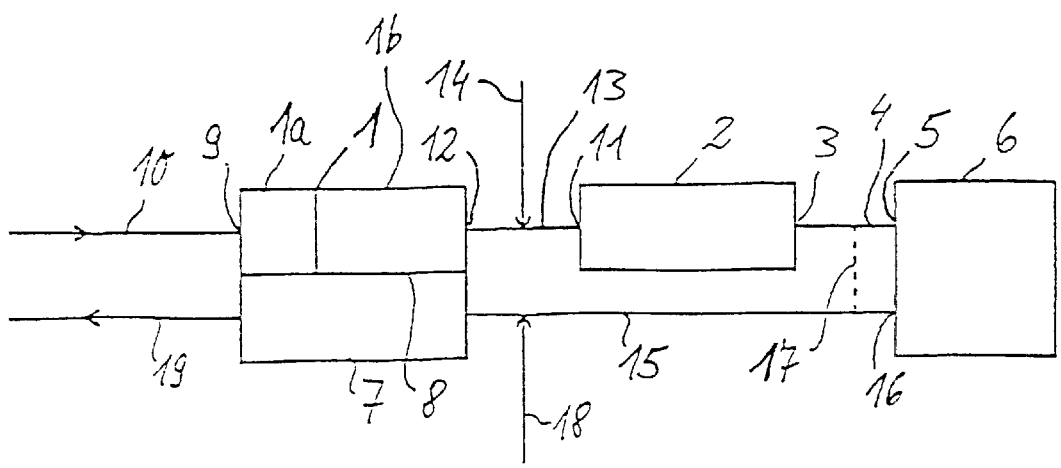
Fig.

METHOD FOR OPERATING A SYSTEM FOR WATER-VAPOR REFORMING OF A HYDROCARBON

BACKGROUND AND SUMMARY OF INVENTION

The invention relates to a method for operating a system for the steam reforming of a hydrocarbon in particular to a method for operating a mobile system for the steam reforming of methanol in a fuel-cell-operated motor vehicle for supplying the hydrogen required for the fuel cells. The term "hydrocarbon" also refers here, for the sake of simplicity, to hydrocarbon derivatives, such as, for example, methanol.

As is known, the steam reforming reaction for the reforming of, for example, methanol takes place endothermally and is carried out at a reaction temperature which is higher than room temperature. When the system is cold-started, therefore, hydrogen cannot be supplied immediately by means of the steam reforming reaction, but, instead, the system parts first have to be brought to a corresponding operating temperature. It is precisely in the application of the system to motor vehicles, however, that it is desirable, after an operation to start the vehicle and therefore also the reforming system has been triggered, to have the drive power furnished by the fuel cells available as soon as possible, which in turn makes it necessary for the reforming system to be capable of supplying hydrogen as quickly as possible. Different procedures for cold-starting systems of this type have already been proposed.

Thus, it is known from the patent specification U.S. Pat. No. 4,820,594, in a reforming reactor housing, to provide, in addition to the actual reforming reactor part, a combustion part, to which a combustible hydrocarbon/air mixture is delivered in a first operating phase during the cold-starting of the system, the said mixture being burnt there with an open flame and thereby heating the reforming reactor part located above it. The reforming reaction is then started after a suitable temperature has been reached.

In a system for the steam reforming of a hydrocarbon, as described in the patent specification U.S. Pat. No. 5,110,559, the reforming reactor housing is likewise divided into a burner part and a reforming reactor part, in order, during cold-starting, to heat the reforming reactor part by means of the burner part. For this purpose, a combustible mixture emanating from the reforming reactor is ignited in the burner part, the combustible hydrocarbon to be reformed being delivered to the reforming reactor even during cold-starting. The hot combustion exhaust gases are transferred from the reforming reactor into a downstream CO shift converter, in order consequently to heat up the latter and thereby bring the system to operating temperature more quickly.

It is known from the patent specification DE 44 23 587 C2 that in a reforming reactor filled with suitable catalyst material, for example Cu/ZnO material, depending on the control of the delivery of the individual reaction partners into the reactor and on the temperature prevailing there, hydrogen can be obtained optionally by means of partial oxidation, which takes place exothermally, and/or endothermal steam reforming of methanol. With suitable process management, the two reactions proceed in parallel, and an autothermal reaction sequence can be established. It is also known from the patent specifications FR 1,417,757 and FR 1,417,758 mentioned there that, during a cold-start of a system for the steam reforming of methanol, a mixture of methanol and oxidizing agent can first of all be introduced into the reforming reactor in order to cause a corresponding combustion reaction to take place there and consequently heat up the reactor. The delivery of the oxidizing agent is then terminated and, instead, the methanol/steam mixture to be reformed is delivered and the steam reforming reaction started. In the systems there, the hydrogen is supplied by means of selective hydrogen separation via hydrogen-permeable membrane walls which are integrated into the reactor.

The preliminary publication EP 0 217 532 A1 describes a reactor for the partial oxidation of methanol, which has a copper-containing catalyst in an upstream zone and a catalyst from the platinum element group in a downstream zone. During cold-starting, the delivered mixture of methanol and of an oxygen-containing gas passes through the upstream zone to the downstream zone, where spontaneous methanol oxidation occurs, which leads to an increase in temperature up to a value at which partial methanol oxidation develops in the upstream zone, specifically in the manner of a "hot spot".

The preliminary publication WO 96/00186 A1 describes a self-starting hydrogen generation system with a reactor for methanol conversion, which likewise contains, on the one hand, a copper-containing material and, on the other hand, a metal of the platinum element group as catalyst material. In the warmed-up operating mode, a self-maintaining partial methanol oxidation reaction takes place, and, by means of the copper-containing catalyst, an ignition of a methanol oxidation reaction is said to be achieved even at room temperature. Moreover, in the warmed-up operating mode, methanol reforming may additionally be carried out by the delivery of water. In order to keep the carbon fraction in the product gas low, the product gas can be led via a selective CO oxidation catalyst or a CO shift catalyst.

The preliminary publication JP 63-129002 (A) discloses a reactor for methanol conversion which has, in succession in the direction of flow, a Pd-based combustion catalyst zone, a Zn—Cr reformer catalyst zone and a Cu—Zn reformer catalyst zone and to which a methanol/water mixture and also air are delivered. In the reformer catalyst region, a reforming reaction is carried out, with heat being delivered from the adjacent combustion catalyst bed.

The technical problem on which the invention is based is to provide a method of the type mentioned in the introduction, by means of which a system for the steam reforming of a hydrocarbon can be brought to its operating temperature as quickly as possible and hydrogen can thereby be supplied correspondingly quickly.

The invention solves this problem by providing a method wherein, at least part of the reforming reactor is used as a multi-function reactor unit, specifically in cold-starting, during a first operating phase, in a first function as a catalytic burner unit and, during a subsequent second operating phase, in a second function as a so-called POX unit, that is to say a unit for the partial oxidation of the hydrocarbon delivered.

The combustion heat generated as a result of catalytic combustion in the first operating phase in this multi-function reactor unit serves for heating at least one downstream system unit, for example a following part of the reforming reactor and/or a following CO oxidizer, and is transported there by the hot combustion exhaust gas and/or by heat conduction. The initial function as a catalytic burner unit ensures rapid first heating of the system. The partial oxidation of the hydrocarbon taking place in the subsequent second operating phase proceeds exothermally and therefore generates further heat for heating the system. At the same time, in this operating phase, hydrogen is already being generated and is therefore available, for example, for the fuel cells of a motor vehicle, before the endothermal steam reforming reaction can then proceed and supplies further hydrogen after a corresponding operating temperature of the system has been reached. In this case, a partial oxidation reaction can take place simultaneously with the reforming reaction or alternately with the latter, for example in order to implement autothermal process management, if there is a need for this.

Furthermore, the method involves one or more of the following three measures. First, there may be provision, shortly before the transition from the first to the second operating phase, for adding water to the delivered mixture of fuel and oxygen-containing gas. Undesirable peak values of the carbon monoxide content in the product gas mixture during the transition to the second operating phase can thereby be avoided. Moreover, the added water can prevent overheating zones during catalytic combustion and function as a heat transfer medium in order to transport the combustion heat occurring during catalytic combustion further on into downstream system units. Secondly, there may be provision, during the first operating phase, for increasing the fuel flow rate with a rising temperature of the multi-function reactor unit, preferably in such a way that the fraction of unburnt fuel in the product gas still just remains desirably low. This means that the fuel flow rate is increased to the extent to which the oxidizing capacity of the multi-function reactor unit grows, with increasing temperature, as regards its catalytic burner function. Thirdly, there may be provision for setting the flow rate of oxygen-containing gas substoichiometrically as early as during the first operating phase, thus resulting, in the product gas, in cleavage products, such as hydrogen and the like, due to thermal decomposition of the fuel used, if appropriate in interaction with added water or water occurring as a result of combustion. These cleavage products can be burnt by means of the renewed addition of air and can thus be utilized for heating downstream components of the reforming system.

By virtue of this mode of operation according to the invention, the system, which, for example, is installed in a mobile manner in a fuel-cell-operated motor vehicle, is capable of delivering hydrogen very quickly after starting and of being heated up rapidly to the operating temperature necessary for the steam reforming reaction.

In a method according to the present invention, that part of the reforming reactor which is used as a multi-function reactor unit serves after the end of a cold-starting phase, during subsequent normal operation when the system has warmed up, in a third function at least temporarily as a reformer unit for the steam reforming of the delivered hydrocarbon and/or as a CO shift unit for converting undesirable carbon monoxide into carbon dioxide.

In a method according to the present invention, there is a transition from the first to the second operating phase after only a few seconds, so that hydrogen is accordingly delivered in appreciable quantities after only a few seconds as a result of the partial oxidation reaction.

In a method according to the present invention, the hydrocarbon to be reformed or hydrogen is used as fuel for catalytic combustion in the multi-function reactor unit during the first operating phase. The advantage of this is that the fuel is readily available, since the hydrocarbon to be reformed is in any case stored in a reservoir, and the hydrogen is generated, for example, during a preceding active operation of the system and part of this hydrogen can be intermediately stored for this later use.

In a method according to the present invention, an inlet-side part of the reforming reactor serves as the multi-function reactor unit, whilst the remaining reforming reactor part functions during the second operating phase, at least in certain regions, as a post-reforming and CO shift converter stage. As a result, the hydrocarbon fractions which have possibly not been converted in the upstream multi-function reactor unit are fully converted in this outlet-side reforming reactor part and, at the same time, the carbon monoxide which has occurred during conversion in this reactor part and in the upstream multi-function reactor unit is converted into carbon dioxide by means of the so-called CO shift reaction with water. Too high a CO fraction in the product gas of the reforming reactor is undesirable in applications in connection with fuel cells, since the carbon monoxide acts in the fuel cells as a catalyst poison.

In a method according to the present invention, during the second operating phase water is added to a greater extent than during subsequent normal operation when the system has warmed up. This improves the transport of heat and reduces the CO fraction in the process gas, as compared with normal operation.

In a method according to the present invention, the substance mixture emerging from the reforming reactor is led through a downstream CO oxidizer, which is thus heated, as early as in the first operating phase, by the combustion gas from catalytic combustion in the multi-function reactor unit and is already performing essentially its normal function in the second operating phase. This normal function involves oxidizing carbon monoxide, which may possibly still be present in the substance mixture led through, so as to form carbon dioxide. In addition, in the first operating phase the CO oxidizer is heated by means of a specific catalytic combustion process. For this purpose, a fuel and an oxygen-containing gas stream are additionally introduced into the CO oxidizer.

In a method according to the present invention, a catalytic burner assigned to the reforming reactor and/or to an evaporator upstream of the latter is at least partially fed, starting from the second operating phase, with the hydrogen-containing product gas formed in the reforming reactor, the said product gas optionally being led first through intermediate system components, such as a CO oxidizer and the anode part of a fuel-cell system. If the continuously generated product gas is not sufficient as fuel, intermediately stored hydrogen or the hydrocarbon also used for reforming may be delivered as fuel to the catalytic burner.

Advantageous embodiments of the invention are described below with reference to the drawing.

BRIEF DESCRIPTION OF THE DRAWING

The single FIGURE shows a block diagram of a system, capable of being operated according to the invention, for the steam reforming of methanol, for the purpose of recovering hydrogen for a fuel-cell system.

DETAILED DESCRIPTION OF THE DRAWING

The system, shown in a block diagram in the FIGURE, for the steam reforming of methanol is suitable for mobile use in a fuel-cell-operated motor vehicle for supplying the hydrogen required for the fuel cells from methanol carried in liquid form. The system contains, as far as is of primary interest here, a reforming reactor 1, a CO oxidizer 2 which is located downstream of the latter and the outlet 3 of which is connected via a hydrogen feed line 4 to the inlet 5 of the anode part 6 of a fuel-cell system, and also a catalytic burner 7 which is in thermal contact with the reactor 1 via a heat-conducting partition 8. The reforming reactor 1 is connected by means of an inlet 9 to a reactor delivery line 10, whilst the CO oxidizer 2 is connected by means of its inlet 11 to the reactor outlet 12. A first intermediate feed line 14 opens into the associated connecting line 13. The catalytic burner 7 is connected on the inlet side to a fuel delivery line 15 which leads away from an outlet 16 of the fuel-cell anode part 6. A bypass line 17 is optionally provided, via which, if required, the gas stream leaving the CO oxidizer 2 can be fed directly, bypassing the fuel-cell anode part 6, into the fuel delivery line 15. In addition, if necessary, methanol and an oxygen-containing gas can be fed into the fuel delivery line 15 via a second intermediate feed line 18. The combustion exhaust gas from the catalytic burner 7 is discharged via an exhaust-gas line 19.

The reforming reactor 1 is divided into an inlet-side multi-function reactor unit 1a and the remaining outlet-side reactor part 1b. Both reactor parts 1a, 1b contain a suitable catalyst material, for example a Cu/ZnO material. Depending on the educt composition, that is to say depending on the composition of the substance mixture introduced via the inlet 9, the inlet-side multi-function reactor unit 1a can work as a catalytic burner unit, as a partial oxidizer unit, that is to say as a so-called POX unit, or as a pure reformer unit. In its functions as a catalytic burner unit and as a POX unit, the multi-function reactor unit 1a has a cold-starting capability, since, in these operating modes, exothermal catalytic reactions take place. Furthermore, the catalytic burner 7, which is external to the reactor and is in thermal contact with the reactor 1 via the gas-tight partition 8, has a cold-starting capability. If required, the CO oxidizer 2 may also be designed with a cold-starting capability.

By the choice of a suitable operating method, the system designed in this way is capable, during cold-starting, of delivering hydrogen after only a very short period of time, so that the fuel-cell system can supply drive power correspondingly quickly, without correspondingly large hydrogen quantities from previous operating cycles having to be intermediately stored for this purpose. The following operating method is preferably provided to this effect.

After a start of the system has been triggered, for example by the triggering of a vehicle start, a first operating phase is initially activated, which lasts only a few seconds. In this first operating phase, the multi-function reactor unit 1a is operated as a catalytic burner unit, for which purpose it has delivered to it liquid methanol or, if available, intermediately stored hydrogen as fuel and, moreover, an oxygen-containing gas, for example air. In this case, a sufficiently high oxygen fraction is selected, so that the desired complete catalytic combustion of the methanol or hydrogen takes place in the multi-function reactor unit 1a. If desired, the delivered quantity of oxygen-containing gas and consequently the oxygen fraction may also be set substoichiometrically, with the result that cleavage products are formed in the product gas due to thermal decomposition of the methanol, if appropriate with the reactive participation of added water or of water formed as the result of combustion, and the said cleavage products can be oxidized by means of the renewed addition of an oxygen-containing gas for the heating of downstream system components. If required, brief electrical preheating may be provided for activating the combustion reaction.

The heat occurring due to catalytic combustion heats up the multi-function reactor unit 1a rapidly. The remaining reactor part 1b heats up equally rapidly by heat conduction and via the hot combustion exhaust gas led through from catalytic combustion in the inlet-side reactor part 1a. The heating of the multi-function reactor unit 1a may be further accelerated in that the fuel flow rate, that is to say the quantity of delivered methanol, is increased continuously, during the first operating phase, with a rising temperature of the oxidizing region of the multi-function reactor unit 1a, just to an extent such that it does not yet lead to an appreciable fraction of unburnt fuel in the product gas. Consequently, the catalytic combustion capacity of the multi-function reactor unit 1a, which rises with an increase in temperature, is utilized optimally. In addition, the entire reactor 1 is heated up via the heat-conducting partition 8 as a result of the simultaneous activation of the catalytic burner 7 external to the reactor. In order to activate the burner 7, liquid methanol and/or hydrogen and also an oxygen-containing gas are likewise fed in a suitable fraction, via the second intermediate feed line 18, into the fuel delivery line 15 for the burner 7.

The CO oxidizer 2 is, on the one hand, passively heated by the hot combustion gas passing through it from catalytic combustion in the multi-function reactor unit 1a. In addition, active heating of the said CO oxidizer is preferably provided in that a catalytic combustion process is also carried out in it. The catalyst material normally contained in such a CO oxidizer for performing its CO oxidizing function during the normal reforming operation of the system is also suitable for catalyzing such a flameless combustion process. For this purpose, once again, liquid methanol and/or hydrogen and also a sufficient fraction of an oxygen-containing gas are fed via the first intermediate feed line 14 into the CO oxidizer 2, where this mixture is burnt catalytically. If required, brief electrical preheating for starting the catalytic combustion process may also be provided in the CO oxidizer 2 and/or in the catalytic burner 7 external to the reactor. If the combustion gases from the reactor 1 and the CO oxidizer 2 which occur during this first operating phase do not have any adverse effect on the starting behaviour of the fuel-cell system in the subsequent operating phase, they are fed into the anode part 6 of the latter and increase the temperature there. They may otherwise be led past the fuel-cell system via the bypass line 17 provided for this purpose.

As soon as the multi-function reactor unit 1a has a sufficiently increased temperature after the few seconds of the first operating phase, a transition is made to a subsequent second operating phase, in which this reactor part 1a is operated as a POX unit. On account of the partial oxidation which then takes place exothermally, there is no need for any further supply of heat from outside. At the same time, from this moment on, hydrogen is generated as a result of the partial oxidation. In order to establish the suitable conditions for carrying out the partial oxidation reaction, the substance quantity ratio of oxygen-containing gas to methanol for the substance mixture introduced into the multi-function reactor unit 1a is reduced in relation to the first operating phase. The substance quantity ratio of water to methanol is preferably increased, as compared with subsequent normal operation when the system has warmed up, in order thereby to assist the transport of heat and to keep the CO fraction in the reformate gas small. The overall educt stream is adjusted in such a way that the methanol conversion as a result of partial methanol oxidation is always sufficiently high. Too low a methanol conversion would disrupt the functioning of the fuel cell or could not be overcome by the downstream catalytic burner 7, and this would lead to undesirable methanol emissions. The available capacity of the system is therefore limited in this operating phase, but a certain amount of capacity is nevertheless available from the system even a few seconds after the start of the system.

In order to avoid carbon monoxide content peaks during the transition from the first to the second operating phase, there is preferably provision for adding water to the mixture of fuel and oxygen-containing gas as early as in the first operating phase, specifically shortly before its end. Moreover, overheating zones during catalytic combustion can be avoided by means of the water added to the multi-function reactor unit 1a, and the added water can function as a heat transfer medium for transporting the heat generated in the multi-function reactor unit 1a further along into the downstream system units.

The outlet-side reactor part 1b is used, during the second operating phase, as a post-reforming and CO shift converter stage, at any event in some regions in those zones which are already sufficiently hot for this purpose. By virtue of the shift converter function, carbon monoxide, a particular fraction of which occurs during partial methanol oxidation and the steam reforming reaction of methanol, is converted into carbon dioxide by means of water via the water/gas equilibrium. In the second operating phase, the CO oxidizer 2 is already working approximately normally, and, during the transition from the first to the second operating phase, catalytic combustion in the CO oxidizer 2 is ended and, instead, the CO oxidation reaction is begun, in that the delivery of methanol and/or hydrogen via the first intermediate feed line 14 is stopped and, instead, only an oxygen-containing gas stream, for example air, is still introduced. Since the CO oxidizer 2 is thus capable, where appropriate, of oxidizing carbon monoxide still contained in the product gas stream of the reforming reactor 1, down to harmless fractions, the product gas, that is to say the reformate gas, can be introduced into the anode part 6 of the fuel-cell system in this second operating phase at the latest. The catalytic burner 7 continues to be operated by means of hydrogen, which leaves the anode part without being used, in order, if necessary, to keep the reforming reactor 1 at temperature. At the same time, in a way not shown, the catalytic burner 7 may serve additionally for heating an evaporator which is located upstream of the reforming reactor 1. If necessary, fuel in the form of methanol or hydrogen can also continue to be delivered, via the second intermediate feed line 18, to the catalytic burner 7, in addition to the hydrogen coming from the fuel-cell anode part 6.

The system is operated in this second operating phase until all the system components are at their operating temperature. The warmed-up system is then changed over to normal operation, in which the steam reforming reaction takes place. For this purpose, the methanol/steam mixture to be reformed, which is prepared by the upstream evaporator from the methanol stored in liquid form and water, is delivered to the reforming reactor 1. The inlet-side multi-function reactor unit 1a then works as a reformer unit, as long as the temperature conditions allow this. The remaining reactor part 1b then also functions as a reformer stage. Carbon monoxide contained in the generated reformate gas is oxidized to a sufficient extent in the downstream CO oxidizer, so that a gas stream which consists essentially of hydrogen and is as free of CO as possible can then be delivered in sufficient quantity to the fuel-cell anode part 6, so that the required drive power for the vehicle can be generated by the fuel-cell system.

If the available heat output is not sufficiently high, particularly in dynamic operating situations, the multi-function reactor unit 1a may temporarily be operated in the POX mode in order to supply heat by means of the corresponding partial methanol oxidation reaction. If required, therefore, the multi-function reactor unit 1a may, during normal operation, be operated exothermally as a POX unit or endothermally as a reformer unit. The respective operating mode can be set by means of the fraction of oxygen-containing gas delivered. More oxygen is conducive to partial oxidation and less oxygen to the reforming reaction. In particular, if required, autothermal process management may also be implemented, in that the extent of partial oxidation is set just so high that the heat generated thereby covers the remaining heat demand of the system. The catalytic burner 7 therefore does not alone have to generate the necessary heat. In particular, during normal operation, in general methanol or hydrogen no longer needs to be delivered via the second intermediate feed line 18.

What is claimed is:

1. A method for operating a system containing a reformation reactor for the steam reforming of a hydrocarbon or hydrocarbon derivative starting substance, comprising:

during a cold-start of the system, delivering a fuel and an oxygen-containing gas mixture to at least part of the reforming reactor;

operating the at least part of the reforming reactor in a first operating phase as a catalytic burner unit;

adding water to the fuel and oxygen-containing gas mixture;

operating the at least part of the reforming reactor as a partial oxidation unit for the partial oxidation of the starting substance in a subsequent second operating phase; and steam reforming the starting substance in the reforming reactor.

2. A method according to claim 1, further comprising, after the operating temperature is reached, operating the reformation reactor at least temporarily as a reformer unit or as a carbon monoxide shift unit.

3. A method according to claim 1, wherein a transition to the second operating phase is a few seconds after operating the first operating phase.

4. A method according to claim 1, wherein the fuel is the starting substance or hydrogen.

5. A method according to claim 1, wherein an inlet-side of the reforming reactor is the at least part of the reforming reactor and, during the second operating phase, an outlet-side part is a post-reforming and a carbon monoxide shift converter stage.

6. A method according to claim 1, further comprising adding water in a higher water/starting substance ratio during the second operating phase than subsequently during the steam reforming after the system has warmed up.

7. A method according to claim 1, further comprising:

feeding a product gas from the reforming reactor to a CO oxidizer;

feeding a mixture of a fuel and of an oxygen-containing gas to the CO oxidizer in the first operating phase for catalytic combustion; and feeding an oxygen-containing gas stream to the CO oxidizer in the second operating phase for the oxidation of carbon monoxide contained in the product gas from the reforming reactor.

8. A method according to claim 1, further comprising:

feeding a fuel/oxygen mixture to a separate catalytic burner that is in thermal contact with the reforming reactor in the first operating phase; and subsequently, at least partially, feeding a product gas from the reforming reactor to the separate catalytic burner.

9. A method for operating a system containing a reformation reactor for the steam reforming of a hydrocarbon or hydrocarbon derivative starting substance, comprising:

during a cold-start of the system, delivering a fuel and an oxygen-containing gas mixture to at least part of the reforming reactor;

operating the at least part of the reforming reactor in a first operating phase as a catalytic burner unit;

increasing a fuel flow rate to the at least part of the reformation reactor as the temperature of the reformation reactor rises;

operating the at least part of the reforming reactor as a partial oxidation unit for the partial oxidation of the starting substance in a subsequent second operating phase; and steam reforming the starting substance in the reforming reactor.

10. A method for operating a system containing a reformation reactor for the steam reforming of a hydrocarbon or hydrocarbon derivative starting substance, comprising:

during a cold-start of the system, delivering a fuel and an oxygen-containing gas mixture to at least part of the reforming reactor, wherein a flow rate of the oxygen-containing gas is substoichiometric;

operating the at least part of the reforming reactor in a first operating phase as a catalytic burner unit;

operating the at least part of the reforming reactor as a partial oxidation unit for the partial oxidation of the starting substance in a subsequent second operating phase; and steam reforming the starting substance in the reforming reactor.

* * * * *